(12) United States Patent
Moya

(10) Patent No.: US 7,025,890 B2
(45) Date of Patent: Apr. 11, 2006

(54) DUAL STAGE CENTRIFUGAL LIQUID-SOLIDS SEPARATOR

(75) Inventor: Emmanuel G. Moya, Corona, CA (US)

(73) Assignee: Griswold Controls, Irvine, CA (US)

( * ) Notice: Subject to any disclaimer, the term of this patent is extended or adjusted under 35 U.S.C. 154(b) by 442 days.

(21) Appl. No.: 10/423,570

(22) Filed: Apr. 24, 2003

(65) Prior Publication Data
US 2004/0211734 A1 Oct. 28, 2004

(51) Int. Cl.
B01D 21/26 (2006.01)

(52) U.S. Cl. .................. 210/788; 210/512.1; 209/727

(58) Field of Classification Search ............... 210/788, 210/512.1; 209/727
See application file for complete search history.

(56) References Cited

U.S. PATENT DOCUMENTS

| 4,072,481 A | 2/1978 | Laval, Jr. |
| 5,320,747 A | 6/1994 | Ford et al. |
| 5,368,735 A | 11/1994 | Ford |
| 5,622,545 A | 4/1997 | Mazzei et al. |
| 5,811,006 A | 9/1998 | Ford |
| 5,827,357 A | 10/1998 | Farion |
| 6,090,276 A | 7/2000 | Ford |
| 6,143,175 A | 11/2000 | Ford et al. |
| 6,167,960 B1 | 1/2001 | Moya |
| 6,202,543 B1 | 3/2001 | Moya et al. |
| 6,330,915 B1 | 12/2001 | Moya |
| 6,398,706 B1 | 6/2002 | Huang |

Primary Examiner—David A. Reifsnyder
(74) Attorney, Agent, or Firm—Mark D. Miller (57) ABSTRACT

Disclosed is a vortex-based centrifugal separator for removing solids from a liquid/solids fluid stream in two stages. A fluid stream under pressure is introduced at the top of the cylindrical separator at a tangential angle forming helical downward flow. The first stage uses a centrally-located spin plate for reversing the cleaner interior flow of the vortex back upward, while the heavier solids settle at the bottom of the chamber for periodic removal. In the second stage, a plurality of louvered slots in an upper discharge pipe remove finer solids from the exiting upward fluid flow prior to discharge.

19 Claims, 10 Drawing Sheets

DUAL STAGE CENTRIFUGAL LIQUID-SOLIDS SEPARATOR

BACKGROUND OF THE INVENTION

1. Field of the Invention

The present invention relates to solid-liquid separators, and more particularly to a new and improved device for centrifugally separating solids from liquids in a liquid/solid mixture in two distinct separation stages that occur during a single pass of the mixture through the device.

2. Description of the Prior Art

It is often desirable to separate solid particles from liquid/solid mixtures or slurries to clarify or purify the remaining liquid. When significant quantities of solids are present, it is impractical to use mesh filters since they will quickly clog and be rendered useless. As a result, centrifugal liquid-solid separators have been developed in the prior art. These devices utilize centrifugal force and gravity to achieve varying degrees of separation of solids from solid/liquid mixtures. The separated solids generally settle to the bottom of the centrifugal chamber from which they are periodically removed.

Many existing centrifugal liquid-solid separators rely upon the rotation of an internal rotor, impeller or blades to create a centrifugal action inside the chamber where the fluid is introduced. Unfortunately, the centrally located rotors in such designs take up considerable space which blocks much of the internal centrifugal flow.

Other existing separators utilize the general principles set forth in U.S. Pat. No. 4,072,481 which discloses a vortex system where the solids/liquid mixture is introduced into a cylindrical chamber at a tangential angle generating centrifugal action in the mixture. In the simple separator of U.S. Pat. No. 5,622,545, a mixture of liquids and gasses is directed in a downward helical path along the internal wall of a cylindrical chamber. A perforated separator tube is provided at the center of the cylinder for receiving gasses which flow toward the center; the gasses escape at the top, and the relatively gas-free liquid is then discharged at the bottom of the chamber. The use of a plurality of simple vortex tubes for solid-liquid-gas-oil separation is disclosed in U.S. Pat. No. 5,827,357.

The employment of a spin plate at the bottom of a vortex tube for reversing the axial direction of flow is shown in the '481 patent above, and in U.S. Pat. Nos. 5,368,735 and 5,811,006. Both of these patents additionally disclose a tube leading from a quiescent region of fluid back to the vortex for re-introduction into the flow. U.S. Pat. No. 6,090,276 discloses a similar but more elaborate re-introduction system which includes additional filtration. In each of these inventions, the separated liquid exits through a smaller tube provided at the top of the cylindrical chamber, and the solids settle at the bottom. The '006 patent also describes turbulence reducing baffles at the bottom. The invention of U.S. Pat. No. 6,143,175 discloses a vortex tube separator having an outer acceptance chamber having a plurality of tangentially oriented entrance slots through which the fluid enters the main cylinder to form the vortex.

Each of the above inventions demonstrates yet another attempt to more completely separate and remove solids from solid/liquid mixtures. However, as demonstrated by the many additional features found in later inventions, complete separation in a vortex-based centrifugal system has yet to be fully achieved.

SUMMARY OF THE INVENTION

The present invention is designed to provide improved separation and removal of solids from a fluid stream containing a mixture of solids, liquids and gasses (the "fluid stream") by providing two distinct stages of separation in a single pass through the invention. In the present invention, the fluid stream is introduced at the top of an elongated cylindrical chamber at a tangential angle to induce a helical flow or vortex inside the chamber. Upon introduction of the fluid stream under pressure, flow velocity is immediately increased by use of an inlet area having a restricted cross section, preferably parabolic in shape. The size of the decreased inlet area is set at a ratio corresponding to the specific gravity of the solids to be separated out. This increase may be any suitable amount, but preferably 3.5 to 4 times the original fluid stream velocity.

As a result of the almost instantaneous increase in velocity, solids are thrown outward towards the wall of the inlet chamber by centrifugal force, and a downwardly spiraling vortex is formed. The introduction of the fluid stream occurs near the top of the cylindrical chamber. At the center of the top of the chamber, an axially oriented tubular outlet or discharge pipe is provided. The incoming fluid stream passes through the annular area around (outside) this pipe which, in one embodiment, is flared at its open bottom (an open bell shape) causing a pinching or compression of the fluid stream. This squeezes air out of the stream causing such air to travel upwards at the center. A set of air breaker vanes located at the top of the chamber serve to break up and collect entrapped air bubbles, and additionally provide reinforcement to the outlet pipe. The entrapped air bubbles are then released through an upper air relief vent.

Meanwhile, the solids-laden fluid stream continues its downward spiral away from the center of the formed vortex. As the stream spirals downward in a decelerating motion, a much cleaner vortex is created at the center of the vessel. A reversing or upper spin plate is provided in the axial center of the chamber, reversing the cleaner flow at the center of the vortex, causing it to travel back upward. The higher the location of this upper spin plate, the less distance the fluid must travel and the less pressure that is lost. This is where the first separation takes place.

The downwardly spiraling fluid stream containing the bulk of the solids passes through the considerable annular gap between the edges of the top spin plate and the cylindrical wall of the chamber, and travels further down and encounters a second spin plate having a set of angled top spin arrestor vanes attached thereto. These arrestor vanes are provided on this lower spin plate at intervals along the interior perimeter of the cylindrical chamber, and are designed to stop the solids from spinning on top of the lower spin plate preventing any grinding wear and/or drilling motion that the solids may contribute. An annular gap is provided between the lower spin plate and the cylindrical chamber wall through which the solids are drawn down into a collection chamber. A set of baffles are provided in the collection chamber to prevent the solids from further spinning and to facilitate quiescent settling of the solids. In one embodiment, this solids collection chamber may be sized to accommodate 3% solids content by weight in proportion to the separator's designed flow capacity, before purging or releasing them to other conveyance periodically or continuously.

Meanwhile, the direction of the cleaner interior fluid stream is reversed above the upper spin plate so that it spirals upward in a vortex at the center of the vessel. This upwardly traveling fluid stream may still contain some smaller/finer solids. Inside the top of the cylindrical chamber, a central discharge pipe is provided in axial alignment with the chamber. The upwardly traveling fluid exits the separator through this discharge pipe. A series of louvered slots are provided along the sides of the discharge pipe such that as the upwardly moving fluid stream passes through the pipe, the remaining smaller/finer solids are drawn back into the main incoming stream that is swirling in a downward direction around the discharge pipe. This occurs because there are lesser centrifugal forces acting on the upwardly returning stream, and because of the pressure/velocity difference between the incoming stream outside of the discharge pipe and the returning stream inside the pipe. The slots are angled to the circular direction of the incoming stream. This is where the second separation takes place. The resulting filtered discharge may be used or re-used to achieve a much cleaner solids free requirement, and the purged solids are separated and effectively collected.

This dual stage centrifugal separation provided by the present invention, with the provision of the top elevated spin plate, the angled top spin arrestors, the installation of air breaker/collector vanes with air relief vent, are all geared in achieving a higher degree and wider range of liquid-solids separation, and elimination of cavitation-producing air bubbles in the stream.

In one aspect of the invention, the lower open end of the discharge pipe has a bell shape for compressing the downwardly traveling fluids against the sides of the chamber, and receiving a wider cross section of the upwardly returning fluid. In another aspect, the lower portion of the cylindrical chamber is enlarged to provide a larger lower annular opening for receiving the solids, and to provide a larger solids settling area.

In another aspect of the invention, a continuous or disjointed helical ridge is provided along the exterior wall at the lower end of the discharge tube, instead of the bell-shaped opening. One or more slotted openings are provided in the wall of the discharge tube adjacent to the ridge. The ridge provides a flow path for the incoming fluid stream, and also a re-entry point for smaller/finer solids from the returning flow stream.

The present invention is most efficient when used to separate and remove solids particles from liquids with a difference in specific gravities of 0.75 and greater; and/or to separate liquids of different densities, viscosities, and specific gravities. Known standard separators can only effectively achieve separation down to 60–75 microns with a differential specific gravity of 1.0 or greater. The present invention provides improved separation by removing solids from spherical diameter down to as small as 25 microns, solids with specific gravity as low as 1.75, or a differential specific gravity of 0.75.

It is therefore a primary object of the present invention to provide a vortex-based separator for removing solids from a liquid/solids fluid stream in two stages, the first stage using a centrally-located spin plate for reversing the cleaner interior flow of the vortex, and the second stage using a plurality of louvered slots in an upper discharge pipe for removing finer solids from the exiting fluid flow.

It is also an important object of the present invention to provide improved separation of solids from a liquid/solids fluid stream by removing solids having a spherical diameter as small as 25 microns, with specific gravity as low as 1.75, or a differential specific gravity as low as 0.75:

It is a further important object of the present invention to provide a vortex-based separator having a plurality of air breaker vanes located at the top of the separation chamber which break up, collect and facilitate removal of entrapped air bubbles to reduce cavitation.

It is a further important object of the present invention to provide a vortex-based separator having a plurality of lower arrestor vanes provided along the interior perimeter of the cylindrical chamber that stop the solids from spinning on top of the lower spin plate preventing any grinding wear and/or drilling motion that the solids may contribute.

It is a further important object of the present invention to provide a vortex-based separator having a set of baffles in the lower collection chamber to prevent the solids from further spinning and to facilitate quiescent settling of the solids.

Additional objects of the invention will be apparent from the detailed descriptions and the claims herein.

DETAILED DESCRIPTION OF THE PREFERRED EMBODIMENTS

Figure 1:
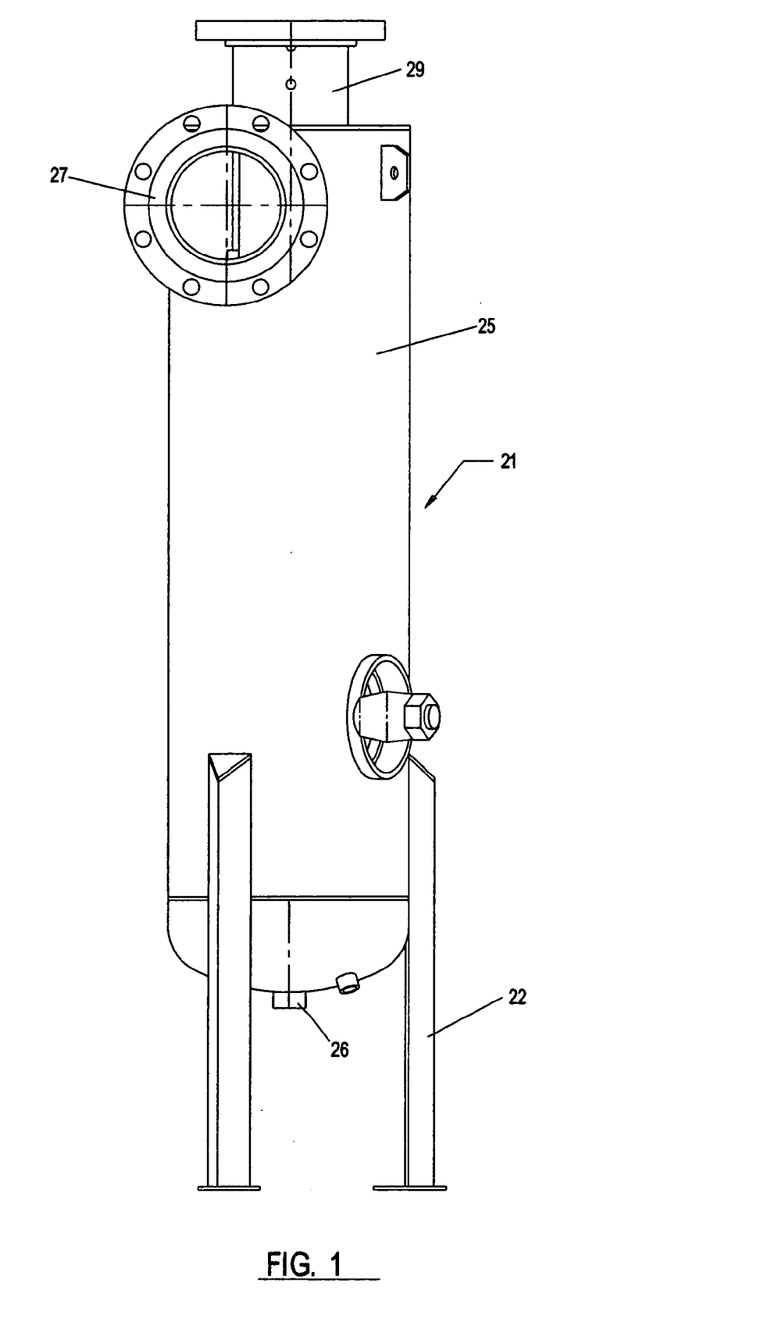
FIG. 1 is a front elevational view of one embodiment of the present invention.
Figure 2:
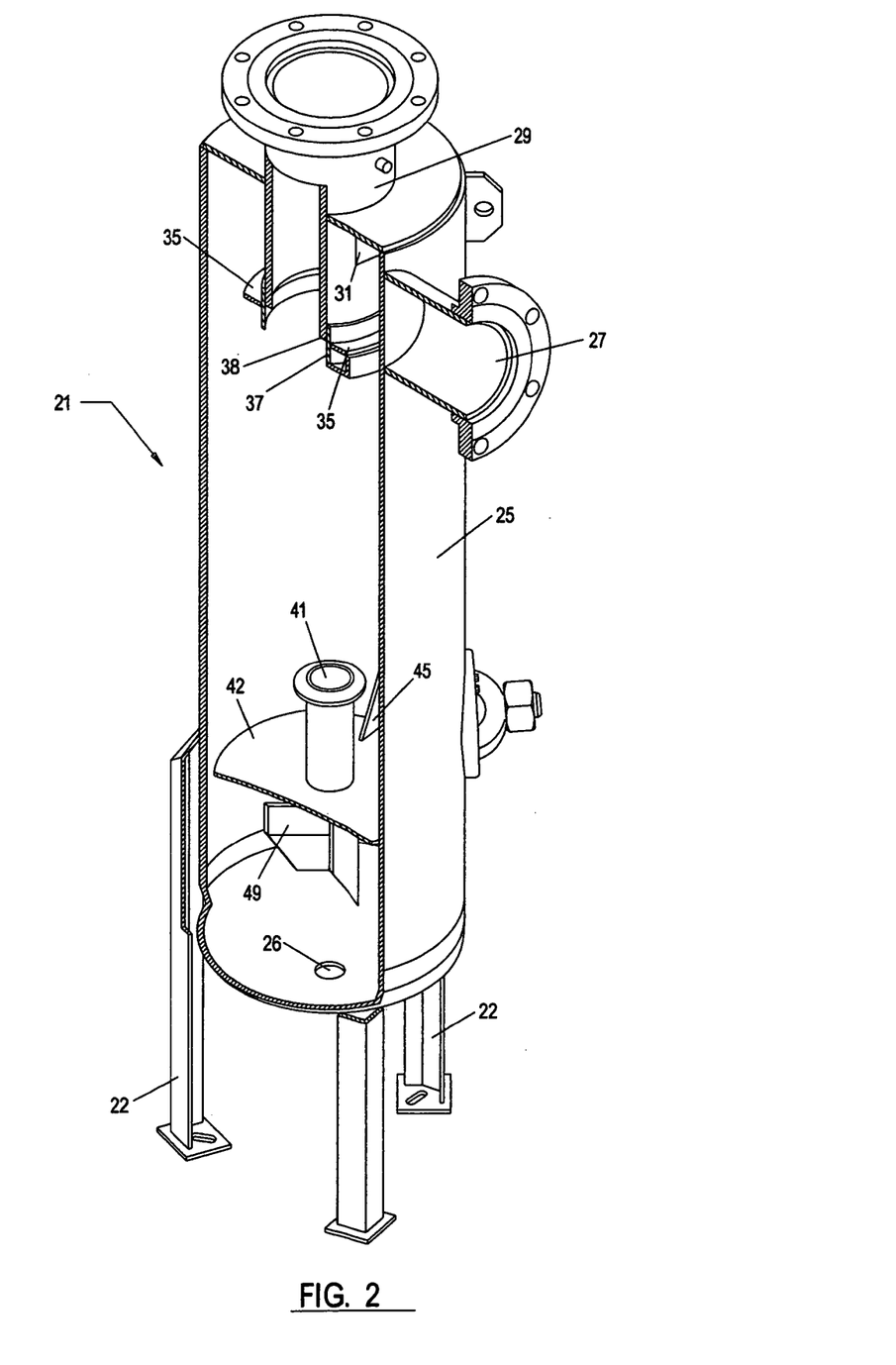
FIG. 2 is an isometric partially cut-away view of the embodiment of FIG. 1.
Figure 3:
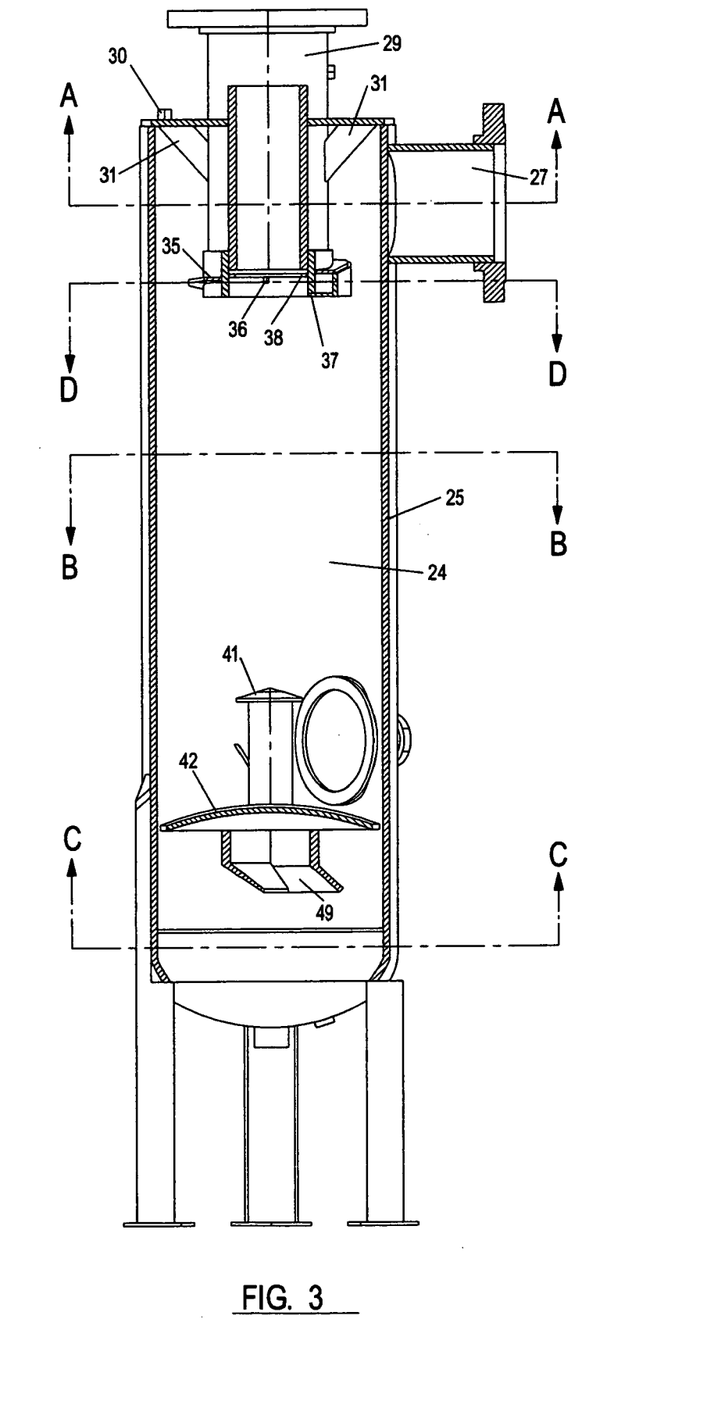
FIG. 3 is a partially cut-away side view of the embodiment of FIGS. 1 & 2.
Figure 4:
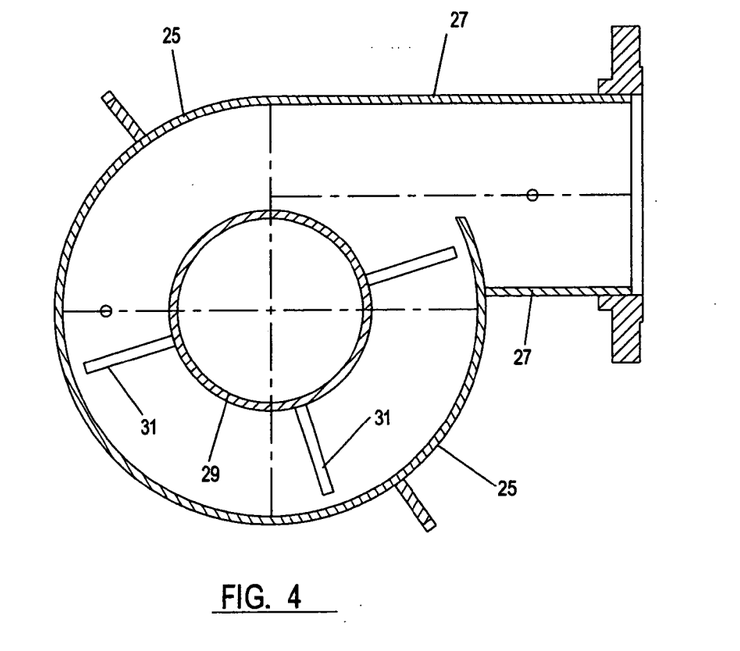
FIG. 4 is a sectional view along line A—A of FIG. 3.

Referring to the drawings wherein like reference characters designate like or corresponding parts throughout the several views, and referring particularly to FIG. 2, it is seen that the invention includes a large vessel 21 supported by a set of exterior legs 22, the vessel having a cylindrical wall 25 defining an internal chamber 24. A lateral inlet pipe 27 is provided near the top of chamber 24 for receiving an incoming fluid stream containing liquid, solids and gasses ("fluid stream"). An adjustable slot or valve 28 is provided along inlet pipe 27 to vary the flow of the incoming pressure stream. Inlet pipe 27 is attached to vessel 21 in such a way that the fluid flow is introduced into chamber 24 at an angle that is generally tangential to cylindrical wall 25, as best illustrated in FIG. 4. This tangential introduction of fluid results in a rotational flow inside chamber 24. A central, axially aligned exit pipe 29 is provided at the top of vessel 21 leading from internal chamber 24 to the exterior. An air escape valve 30 is provided at the top of vessel 21, and a solids discharge opening 26 is provided at the bottom of vessel 21, each in communication with interior chamber 24.

A plurality of air breaker vanes 31 are provided along the upper edge of chamber 24 for interrupting the upper portions of the incoming fluid stream to make contact with air bubbles in the fluid stream and direct them toward the top of vessel 21 where they may escape through valve 30. Vanes 31 also provide support and reinforcement for exit pipe 29.

Figure 7:
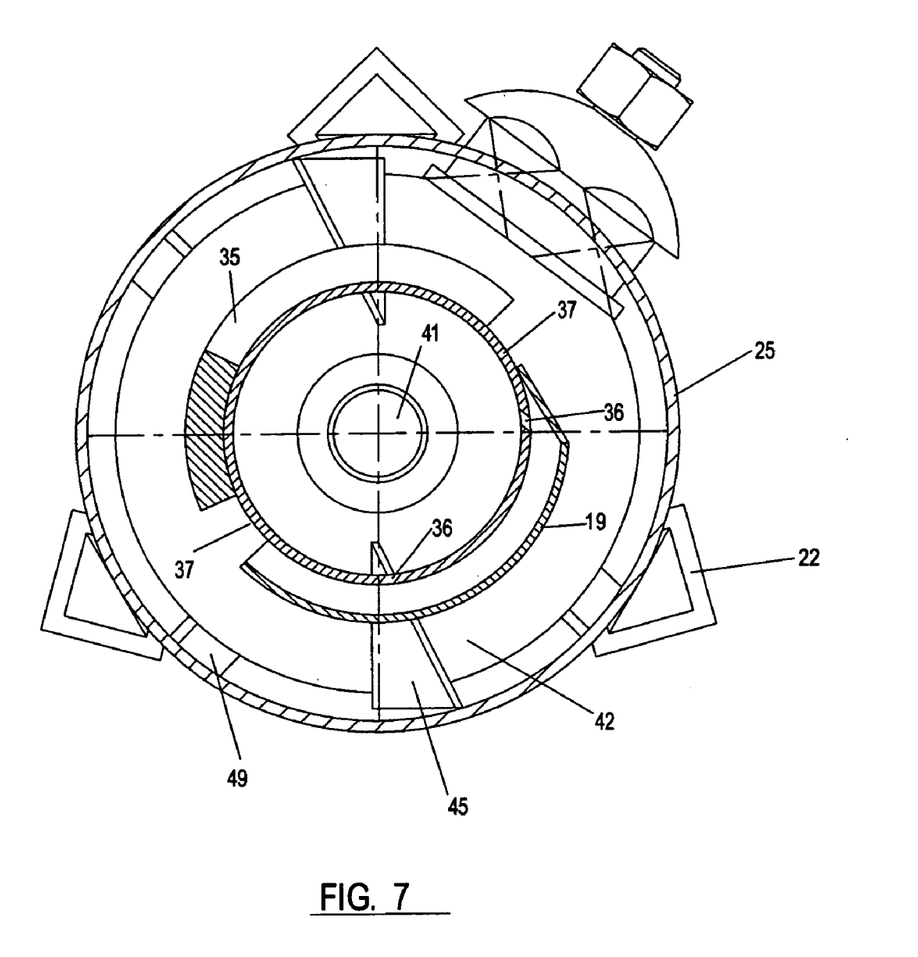
FIG. 7 is a sectional view along line D—D of FIG. 3.
Figure 8:
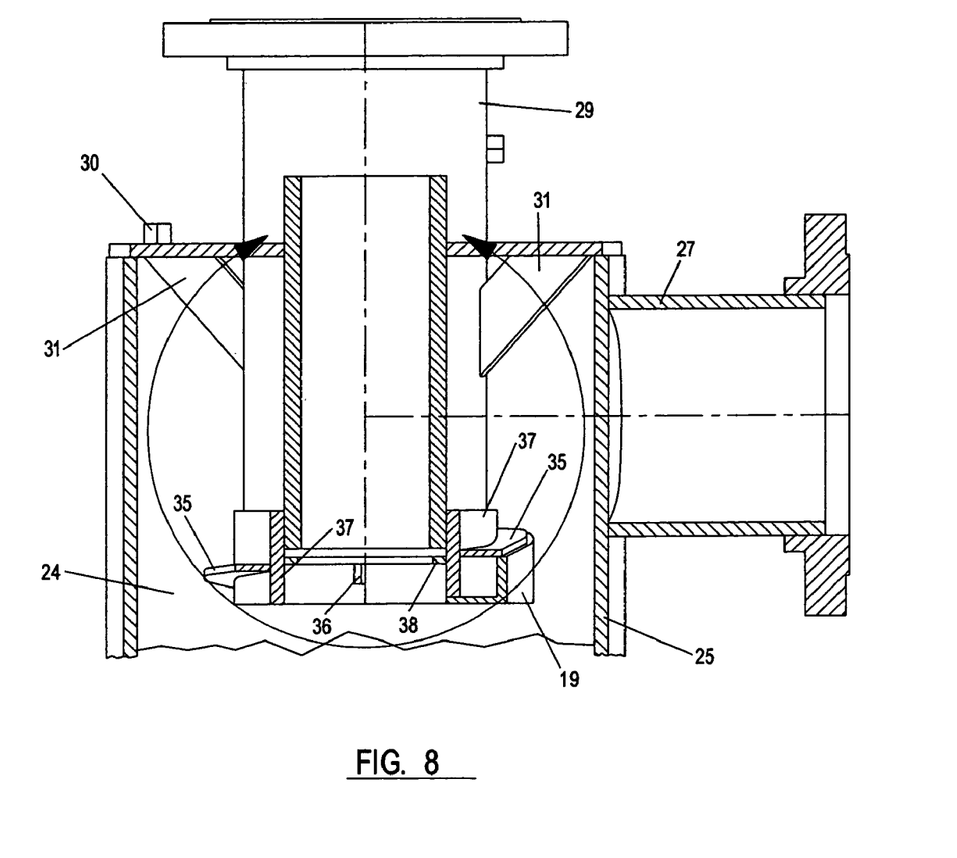
FIG. 8 is an enlarged view of the upper portion of the invention shown in FIG. 3.
Figure 9:
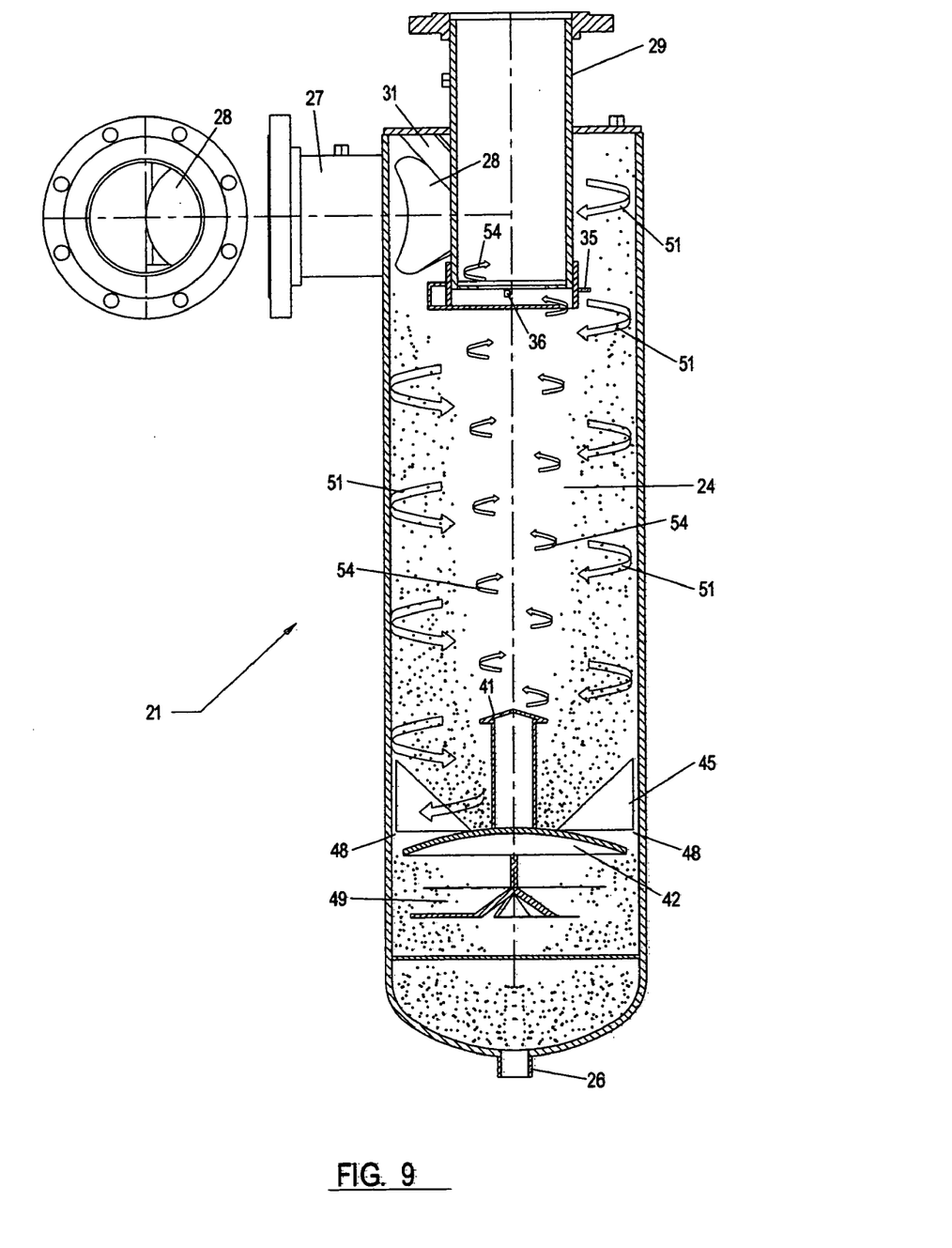
FIG. 9 is a diagrammatic cut away view showing the operation of the invention.
Figure 10:
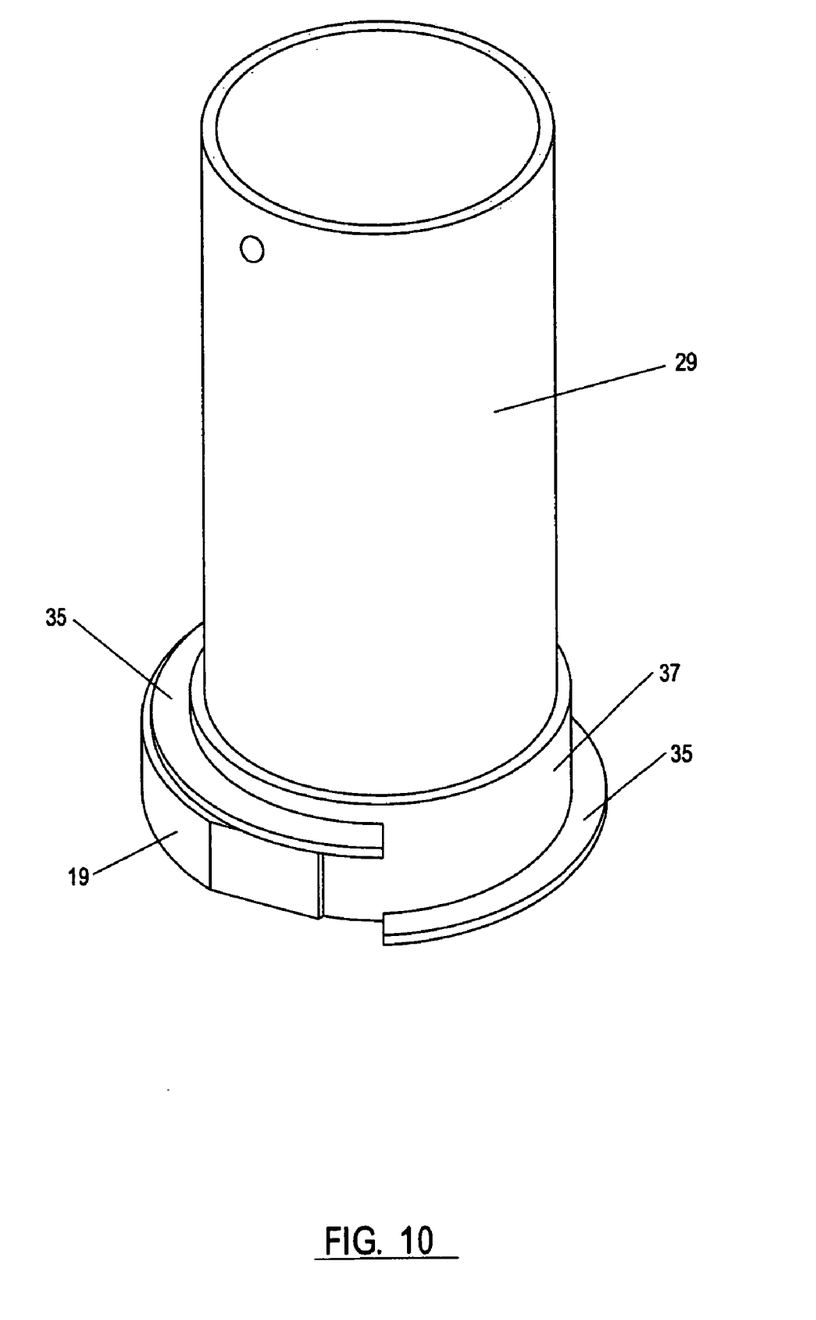
FIG. 10 is an enlarged view of the exit pipe of the embodiment of FIGS. 1–9.

Referring to FIGS. 3, and 7–10 it is seen that a cylindrical sleeve or choke ring 37 is provided around the lower end of discharge pipe 29, ring 37 having a diameter slightly larger than that of pipe 29. As shown in more detail in FIG. 8, the junction of ring 37 and pipe 29 forms an internal annular shoulder 38 which restricts the upward flow into pipe 29. A continuous or disjointed helical ridge 35 (spiral skirt ring) is provided around the outside cylindrical edge of ring 37, such that ridge 35 protrudes into main chamber 24. A plurality of slotted openings 36 are provided in the cylindrical wall of ring 37 in the vicinity of ridge 35 as best shown in FIGS. 7 and 9. Openings 36 are preferably angled so that fluid passing therethrough from inside pipe 29 enters chamber 24 in harmony the rotational flow established therein. A semi-circular L-shaped flange 19 is provided on the outside of ring 37 adjacent to ridge 35 creating a path for receipt of the materials discharged through angled slots 36. It is to be appreciated that angled openings 36 may be provided in any suitable locations on ring 37 or on exit pipe 29. In a slight variation of this embodiment, sleeve 37 may be eliminated and ridge 35 attached directly to the lower end of exit pipe 29. In this variation, angled openings 36 are provided on pipe 29 in the vicinity of ridge 35, and flange 19 may be attached to pipe 29 or it may be eliminated altogether.

Figure 5:
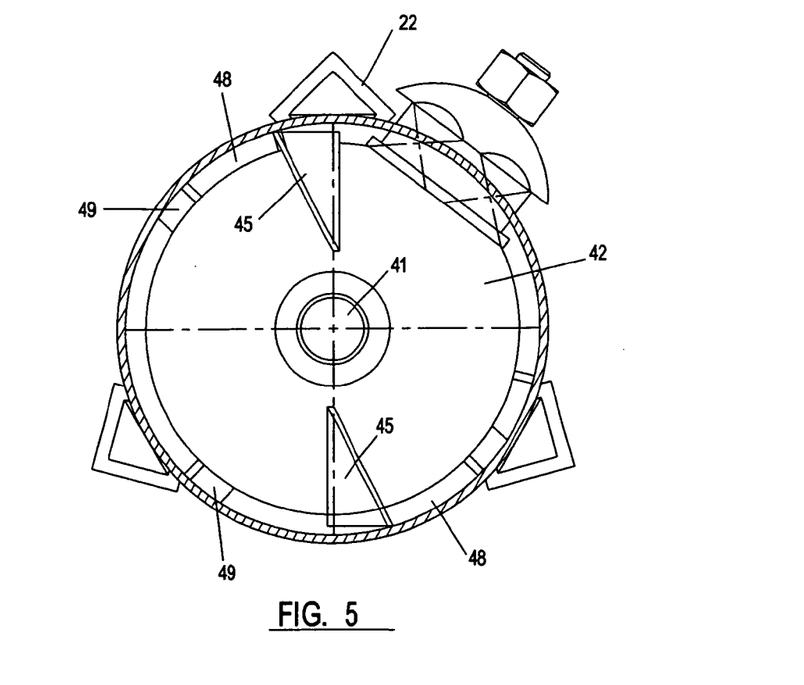
FIG. 5 is a sectional view along line B—B of FIG. 3.

In the lower section of chamber 24, a centrally located axially oriented reversing or spin plate 41 is provided. This upper spin plate 41 may have a flat surface, or may have a slightly conical shape as illustrated in the drawings. A lower spin plate 42, having a larger diameter than upper spin plate 41, is provided in chamber 24 below upper spin plate 41. Lower spin plate 42 may be flat or concave in shape. Plate 42 is also centrally located and axially oriented, and defines an annular gap 48 between the outer edge of plate 42 and the inside edge of wall 25. A plurality of upwardly oriented, angled top spin arrestor vanes 45 may be provided on lower spin plate 42, extending over gap 48 as shown in FIG. 5.

Figure 6:
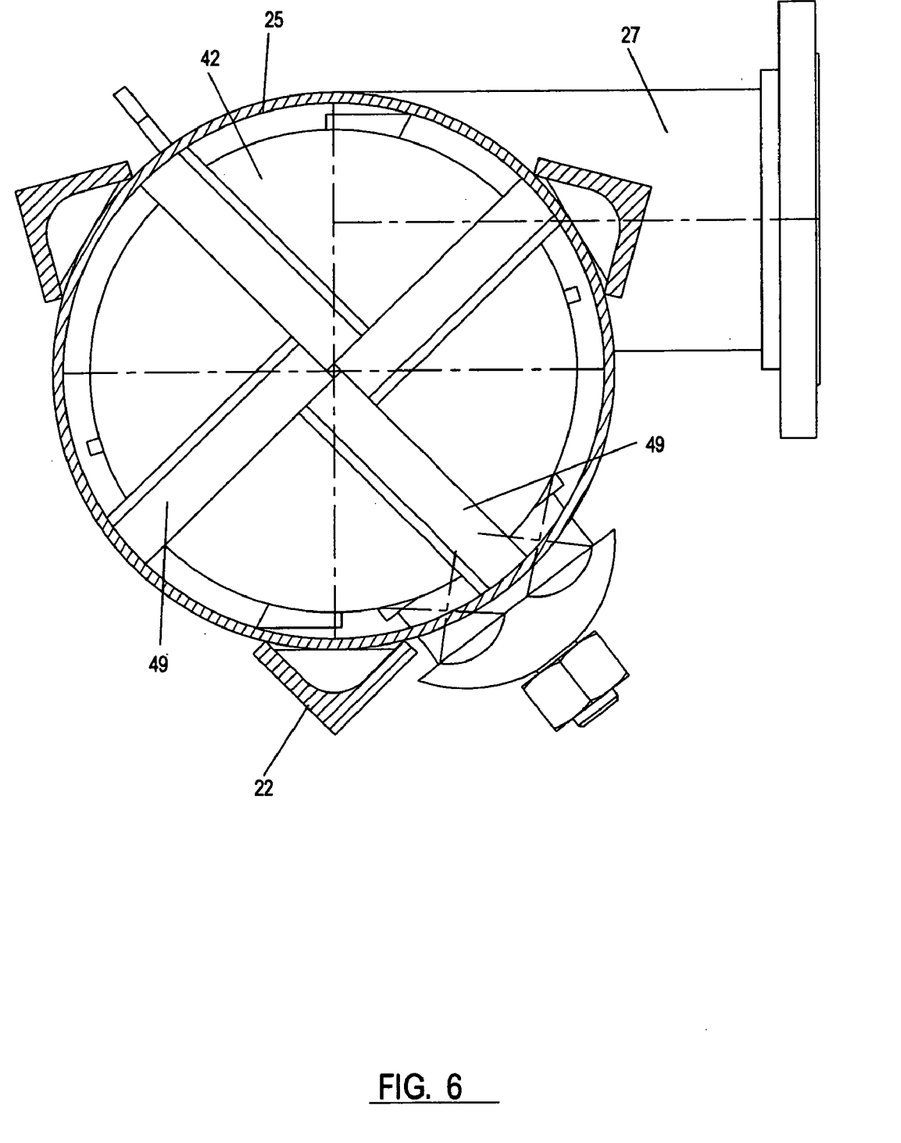
FIG. 6 is a sectional view along line C—C of FIG. 3.

The area of chamber 24 below lower spin plate 42 is where solids settle out. A plurality of baffles 49 may be provided in this area, the baffles extending radially from the center of chamber 24 to the chamber wall 25 as shown in FIG. 6. A solids discharge opening 26 is provided below these baffles at the bottom of chamber 24.

Figure 11:
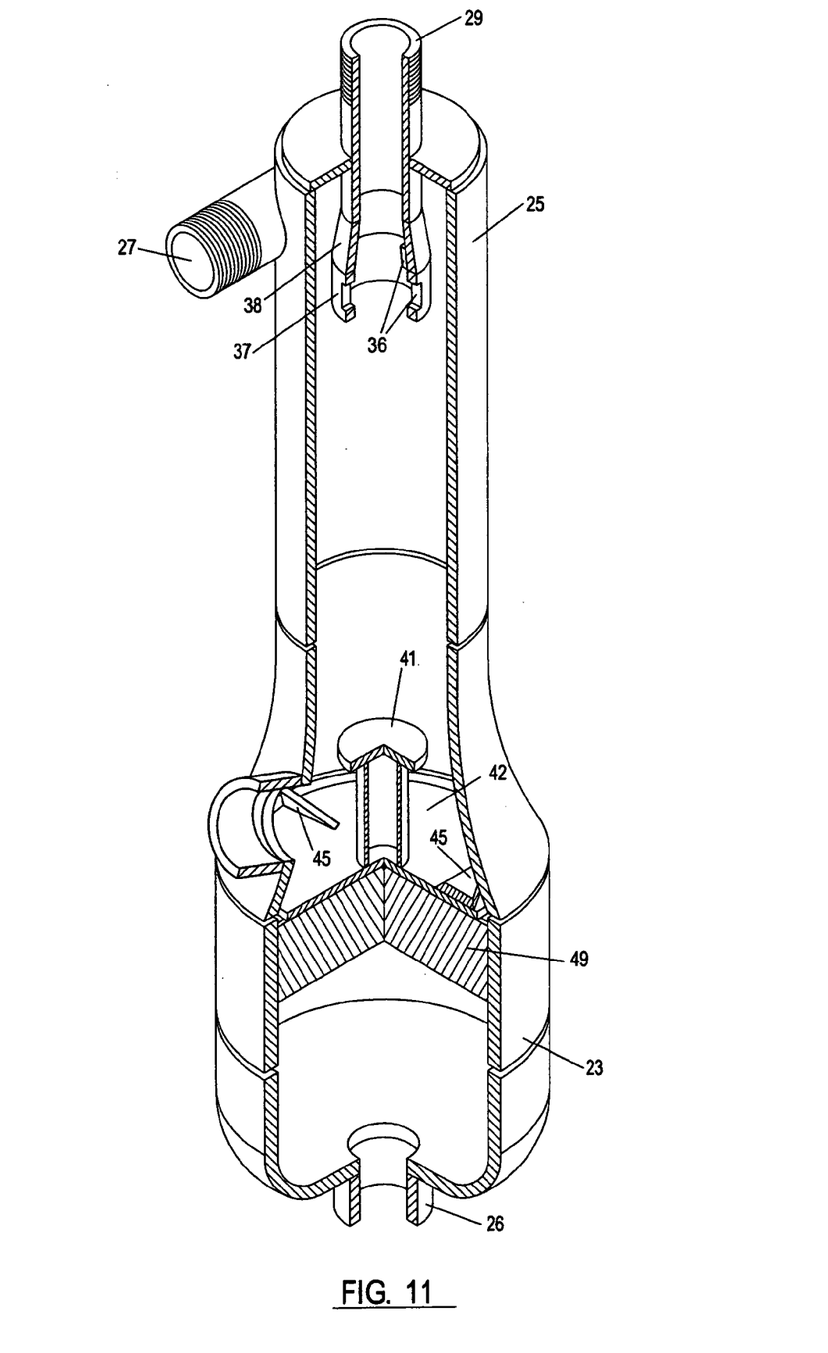
FIG. 11 is a perspective partially cut-away view of an alternative embodiment of the present invention.

In an alternative embodiment shown in FIG. 11, the lower cylindrical section 37 of upper discharge pipe 29 is wider than the remaining pipe forming a bell shape with angled section 38. No helical ridge is provided in this embodiment, and the slotted openings 36 are provided in lower section 37. It is to be appreciated that openings 36 may be provided in any or all of sections 29, 37 or 38 of the discharge pipe. The alternative embodiment of FIG. 11 also illustrates a lower chamber section having a wider diameter wall 23 than the main cylinder wall 25. This section holds more solids thereby allowing for more accumulation and hence more time between solids discharge or removal operations.

The operation of the dual stage separator is illustrated in FIG. 9. Initially, a fluid stream containing liquid/solids/gas under pressure is introduced through inlet opening 27. The fluid flow may be restricted using valve 28. The amount of closure of valve 28 is determined by the specific gravity of the fluid stream introduced. Closing valve 28 causes the fluid stream to accelerate as it enters the vessel 21 at an angle that is tangential to cylindrical wall 25, thereby inducing a rotational flow in chamber 24 around the inside of wall 25 as shown by arrows 51. This flow induces a vortex, pushing the heavier solids outward by centrifugal force, and leaving a cleaner flow in the center. This main rotational flow carries the solids down into the vessel 21 along the outside walls 25. The incoming fluid stream first encounters air breaker vanes 31 along the upper edge of chamber 24 which make contact with air bubbles in the fluid stream and directs them toward the top of vessel 21 where they may escape through valve 30.

As the helical flow continues downward, it passes between pipe 29 and wall 25, traveling along helical ridge 35. As explained more fully below, finer solids are re-introduced into this main flow through slots 36 in sleeve 37 or pipe 29 at this time. The main flow travels downward slowing in speed as it reaches the central portion of chamber 24. Here, the central, cleaner portion of the downward flow encounters upper spin plate 41 which causes this central part of the flow to reverse direction and travel upwards, as shown by arrows 54 of FIG. 9. The outer portion of the flow continues downward according to arrows 51 and next encounters lower spin plate 42. A plurality of optional angled arrestor vanes 45 may be attached to lower spin plate 42. Vanes 45 interrupt and direct the solids-laden outer flow through annular opening 48 into the lower portion of chamber 24.

The lower portion of chamber 24 may simply be a large holding area, but is preferably divided into sections by a set of baffles 49 which further slow the motion of the fluid entering the lower chamber. It is to be appreciated that any suitable number of baffles may be used dividing the lower chamber into additional sections. The solids are then periodically or continuously removed from this quiescent lower chamber through opening 26.

Meanwhile, the cleaner central flow has reversed direction and spirals upward toward central discharge tube 29. This flow may still contain some finer solids. A second stage centrifugal separation starts at the entry ring 37 to discharge tube 29 where annular shoulder 38 impedes the encircling smaller solids. A venturi effect is created in the angled openings 36, drawing these solids through angled slots 36 in ring 37 as a result of the difference in pressure between the high speed incoming flow 51 and the lower speed returning flow 54. Some of the solids are drawn into a vacuum chamber formed by flange 19 and returned to the main downward flow. The remaining clean fluid continues upward and exits vessel 21 through discharge tube 29.

In the alternative embodiment of FIG. 11, as the downward flow passes the outside of bell-shaped discharge pipe 37–38 it is compressed which further increases velocity, further pushes the main flow toward the outside walls, and squeezes out (up) trapped air bubbles. The air bubbles travel in an upward direction along the outside wall where they make contact with air breaker vanes 31 and are released through vent 30. The returning flow 54 enters pipe 37 at a lower speed and is accelerated by the squeezing action of angled annular flange 38. Angled slots 36 are preferably provided in the lower pressure section 37 so that any remaining solids are drawn through the slots by virtue of the large pressure differential between flow 51 and 54 around section 37. However, slots 36 may additionally or alternatively be provided on section 38 and on pipe 29.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A centrifugal liquid/solids separator comprising:
   a. a vessel having a cylindrical side wall, and upper and lower end walls forming an interior chamber, said chamber having an upper section and a lower section;
   b. an inlet in said cylindrical wall near the upper end wall for introducing fluid under pressure at an angle that is tangential to said cylindrical side wall;

c. an outlet pipe axially mounted in the upper end wall of said vessel, said outlet pipe having a cylindrical wall of lesser diameter than said vessel, a hollow interior, an upper portion that extends out from said upper end wall to a top, and a lower portion that extends into the upper section of said chamber to a bottom;

d. a helical ring attached around the cylindrical wall of said outlet pipe at the bottom thereof such that said ring protrudes into the upper section of said chamber;

e. a plurality of radially spaced apart axially-extending openings passing through the wall of said outlet pipe in the vicinity of said helical ring fluidly interconnecting the interior of said outlet pipe and the upper section of said chamber;

f. an upper axially oriented circular spin plate of small diameter extending across said chamber in the lower section thereof;

g. a lower axially oriented circular spin plate having a larger diameter than said upper spin plate, said lower spin plate extending across said chamber at a location below said upper spin plate and defining an annular gap between the edge of said lower spin plate and the cylindrical wall of said vessel; and h. a discharge opening in the lower end wall of said vessel.

2. The separator of claim 1 wherein said inlet defines a rotational direction for fluid flow inside said chamber, and said plurality of openings are angled such that fluid enters the upper section of said chamber through said openings in the same rotational direction as the rotational direction in said chamber.

3. The separator of claim 1 wherein said helical ring is discontinuous.

4. The separator of claim 1 wherein a plurality of air breaker vanes are provided in the upper section of said chamber extending radially between the cylindrical wall of said vessel and said outlet pipe, and wherein an air escape valve is provided in the upper end wall of said vessel.

5. The separator of claim 1 wherein a plurality of spin arrestor vanes are provided in the lower section of said chamber above said lower spin plate, extending radially across the annular gap between said lower spin plate and the cylindrical wall of said vessel.

6. The separator of claim 1 wherein the surface of said upper spin plate is selected from the group consisting of flat, conical and concaved; and the surface of said lower spin plate is selected from the group consisting of flat, conical and concaved.

7. The separator of claim 1 wherein a plurality of baffles are provided in the lower section of said chamber below said lower spin plate said baffles extending radially between the center of said chamber and the cylindrical vessel wall.

8. A centrifugal liquid/solids separator comprising:

a. a vessel having a cylindrical side wall, and upper and lower end walls forming an interior chamber, said chamber having an upper section and a lower section;

b. an inlet in said cylindrical wall near the upper end wall for introducing fluid under pressure at an angle that is tangential to said cylindrical side wall;

c. an outlet pipe axially mounted in the upper end wall of said vessel, said outlet pipe having a cylindrical wall of lesser diameter than said vessel, a hollow interior, an upper portion that extends out from said upper end wall to a top, and a lower portion that extends into the upper section of said chamber to a bottom;

d. an annular sleeve attached to the bottom of said outlet pipe, said sleeve extending into said chamber below the bottom of said pipe and defining an annular shoulder on the inside thereof;

e. a helical ring attached around said sleeve such that said ring protrudes into the upper section of said chamber;

f. a plurality of radially spaced apart axially-extending openings passing through the wall of said sleeve in the vicinity of said helical ring fluidly interconnecting the interior of said sleeve and the upper section of said chamber;

g. an upper axially oriented circular spin plate of small diameter extending across said chamber in the lower section thereof;

h. a lower axially oriented circular spin plate having a larger diameter than said upper spin plate, said lower spin plate extending across said chamber at a location below said upper spin plate and defining an annular gap between the edge of said lower spin plate and the cylindrical wall of said vessel; and i. a discharge opening in the lower end wall of said vessel.

9. A centrifugal liquid/solids separator comprising:

a. a vessel having a cylindrical side wall, and upper and lower end walls forming an interior chamber, said chamber having an upper section and a lower section;

b. an inlet in said cylindrical wall near the upper end wall for introducing fluid under pressure at an angle that is tangential to said cylindrical side wall wherein said inlet defines a rotational direction for fluid flow inside said chamber;

c. an outlet pipe axially mounted in the upper end wall of said vessel, said outlet pipe having a cylindrical wall of lesser diameter than said vessel, a hollow interior, an upper portion that extends out from said upper end wall to a top, and a lower portion having a flared section forming a bell shape that extends into the upper section of said chamber to a bottom;

d. a plurality of radially spaced apart axially-extending openings passing through the wall of the bell-shaped flared section of said outlet pipe fluidly interconnecting the interior of said outlet pipe and the upper section of said chamber wherein said plurality of openings are angled such that fluid enters the upper section of said chamber through said openings in the same rotational direction as the rotational direction in said chamber;

e. an upper axially oriented circular spin plate of small diameter extending across said chamber in the lower section thereof;

f. a lower axially oriented circular spin plate having a larger diameter than said upper spin plate, said lower spin plate extending across said chamber at a location below said upper spin plate and defining an annular gap between the edge of said lower spin plate and the cylindrical wall of said vessel; and g. a discharge opening in the lower end wall of said vessel.

10. The separator of claim 8 wherein said inlet defines a rotational direction for fluid flow inside said chamber, and said plurality of openings are angled such that fluid enters the upper section of said chamber through said openings in the same rotational direction as the rotational direction in said chamber.

11. The separator of claim 10 wherein a flow restricting valve is provided in said inlet for increasing the velocity of fluid under pressure introduced through said inlet.

12. The separator of claim 11 wherein said flow restricting valve has a parabolic shape.

13. The separator of claim 8 wherein an annular flange is provided on said sleeve below said helical ring.

14. A method for removing solids from a liquid/solids fluid stream comprising the steps of:
   a. introducing a pressurized fluid stream containing solids and liquids into an upper section of a cylindrical vessel at tangential angle to induce a rotational flow inside said vessel;
   b. pushing the heavier solids in said fluid stream outward by centrifugal force;
   c. guiding said fluid stream into a downward spiral using a centrally located helical ridge;
   d. moving the solids in said downwardly spiraling fluid stream along the inside of the cylindrical vessel to a lower collection chamber in said vessel;
   e. reversing the direction of flow of the central portion of said downwardly spiraling fluid stream using an axially oriented central spin plate causing said central portion to spiral upward;
   f. receiving said upwardly spiraling central portion of said fluid stream into an upper exit pipe that is axially attached at the top of said cylindrical vessel;
   g. separating finer solids from said upwardly spiraling fluid stream through a plurality of radially spaced apart axially-extending openings in said exit pipe, said openings interconnecting the interior of said exit pipe and the upper section of said vessel;
   h. discharging the remainder of said upwardly spiraling fluid stream through said exit pipe; and
   i. periodically purging the solids from said lower collection chamber.

15. The method of claim 14 further comprising the step of narrowing the upwardly spiraling fluid stream as it enters said exit pipe using an annular choke ring.

16. The method of claim 14 further comprising the step of restricting the input of said pressurized fluid stream to increase the flow rate inside the vessel.

17. The method of claim 14 further comprising the steps of separating air bubbles from the rotational flow in the upper section of said vessel using a plurality of air breaker vanes adjacent to said input, and periodically removing said separated air using a relief valve.

18. The method of claim 14 further comprising the steps of interrupting the downwardly spiraling fluid stream using a plurality of spin arrestor vanes located below said spin plate and extending radially toward the cylindrical wall of said vessel to stop said rotational flow.

19. The method of claim 14 further comprising the step of settling said solids using a plurality of baffles located in the lower section of said vessel.

* * * * *